Sept. 11, 1934.   S. G. GENTNER   1,973,249
VALVE
Filed July 6, 1933
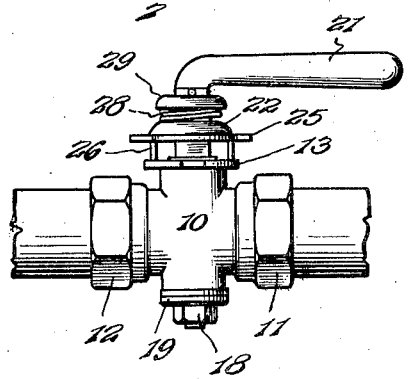
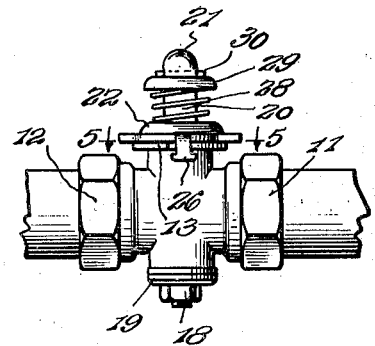
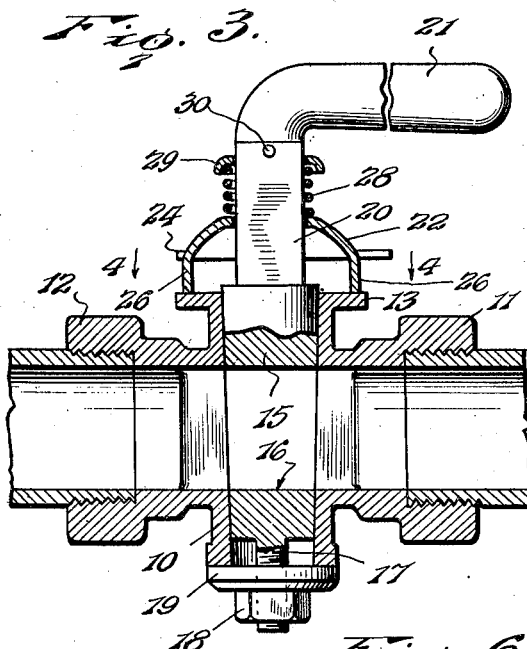
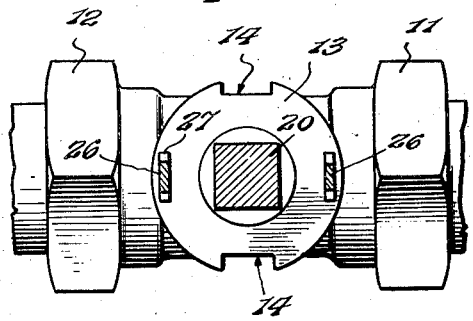
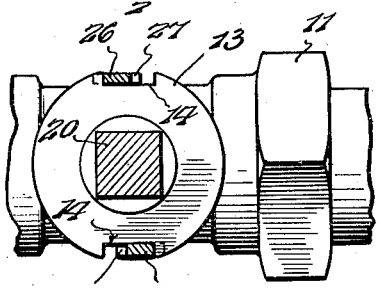
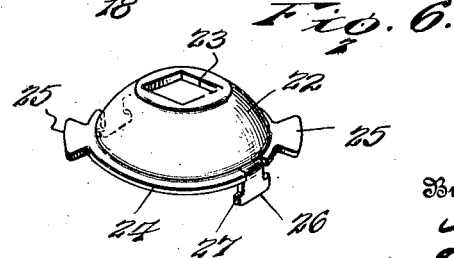
Inventor
S. G. Gentner.
By Lacey & Lacey, Attorneys Patented Sept. 11, 1934

1,973,249

UNITED STATES PATENT OFFICE 1,973,249

VALVE

Stephen G. Gentner, Detroit, Mich.

Application July 6, 1933, Serial No. 679,237

1 Claim. (Cl. 251—164)

This invention relates to an improved valve and while being particularly intended for use in conjunction with gas stoves or other gas appliances is, nevertheless, well adapted for general application.

The invention seeks, among other objects, to provide a valve which will be automatically locked in closed position so that when the valve is turned to shut off the supply of gas to a gas stove, for instance, the valve cannot be accidentally opened to possibly cause asphyxiation.

A further object of the invention is to provide a valve wherein, when the valve plug is turned to closed position, the locking collar employed will be automatically shifted for locking the valve closed.

And the invention seeks, as a still further object, to provide a valve wherein, after the locking collar has been shifted for locking the plug against opening movement, the plug may be turned for locking the collar against retraction to free the valve plug.

With the foregoing and other objects in view, the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification, Figure 1 is a side elevation of my improved valve showing the valve in open position, Fig. 2 is an elevation showing the valve plug in closed position, Fig. 3 is an enlarged sectional view through the valve, Fig. 4 is a transverse section on the line 4—4 of Fig. 3, Fig. 5 is a fragmentary section on the line 5—5 of Fig. 2, Fig. 6 is a detail perspective view particularly showing the locking collar employed.

In carrying the invention into effect, I employ a valve casing 10 provided at one side with an inlet 11 and at its opposite side with an outlet 12. The inlet and outlet are preferably internally screw threaded so that the valve may be readily interposed in the gas line, as suggested in the drawing, and formed on the valve casing, at its upper end, is an annular radial flange 13 provided at opposite sides thereof, as particularly seen in Fig. 4, with notches 14.

Rotatably fitting in the valve casing is a tapered valve plug 15 having a diametric port 16, and formed on the plug at its lower end is a stud 17 upon which is screwed a nut 18 coacting with a washer 19 for rotatably securing the valve plug in position. At its upper end, the plug is provided with a squared upstanding stem 20 and extending laterally from said stem is a handle 21.

Slidable upon the stem 20 of the valve plug is a substantially hemi-spherical locking collar 22 having a squared opening 23 therein to receive the stem 20 so that the collar will turn with the stem as the valve plug is rotated and extending from the lower end of the collar is a lateral base flange 24 adapted to rest flat on the flange 13 of the valve casing. Extending from the flange 24 at opposite sides of the collar are radial ears 25 and formed on the lower end of the collar, in spaced relation to said ears, is a pair of oppositely disposed depending locking lugs 26 each headed to provide lateral shoulders 27 at opposite edges thereof.

Surrounding the valve stem 20 to rest at one end against the upper end of the collar 22 is a spring 28 and overlying the upper end of said spring is a washer 29. Extending through the stem, above the washer, is a removable pin 30 for limiting the washer against upward displacement so that the spring 28 will thus function to press the locking collar 22 downwardly.

When the valve is open, as shown in Figs. 1 and 3, the lugs 26 of the collar 22 will rest on the flange 13 of the valve casing so that the spring 28 is tensioned to exert a pronounced downward pressure on the collar and, as will now be seen, the collar will be turned with the valve plug 15 as the handle 21 is manipulated for rotating the valve plug. Accordingly, as the valve plug is turned to closed position, the locking lugs 26 of the collar will be brought into register with the notches 14 in the flange 13 when the spring 28 will depress the collar and project said lugs through said notches for locking the plug in closed position. As shown in Fig. 2, the flange 24 of the collar will then seat against the flange 13 of the valve casing and attention is now directed to the fact that a further slight rotative movement of the valve plug in a closing direction will serve to engage a corresponding pair of the shoulders 27 of the lugs 26 beneath the flange 13 while a slight rotative movement of the plug in an opening direction will serve to engage an opposite corresponding pair of said shoulders beneath said flange. Thus, as brought out in Figs. 2 and 5, the valve plug may, after the lugs 26 of the collar 22 have been projected through the notches 14 of the flange 13, be slightly turned in either one direction or the other for shifting the collar to locked position so that the collar cannot be accidentally raised to free the valve plug.

When it is desired to open the valve, the valve plug 15 is first slightly turned to free the locking lugs 26 from engagement beneath the flange 13 when the ears 25 are grasped and the collar raised to retract said lugs through the notches 14. The plug is then turned to dispose the lugs 26 out of register with said notches so that upon release of the collar 22, the lugs 26 will again ride on the flange 13 of the valve casing. Accordingly, the handle 21 may then be freely manipulated for rotating the valve plug to open position.

Having thus described the invention, I claim:

A valve including a casing, a flange carried by said casing and formed with a passage, a rotatable plug carried by said casing and having a stem, a locking collar slidable along said stem and turning with the stem and plug, a spring urging said collar towards said flange, said collar having a lug normally resting on the upper face of said flange for supporting the collar in an inactive position in spaced relation to the flange and being movable through said passage when the plug is in closed position for locking the plug against rotary movement to an open position, and shoulders at opposite sides of said lug, one or the other of said shoulders being movable into position to underlie a portion of the flange by rotating the plug while closed a short distance in either direction and thereby hold the collar against retraction.

STEPHEN G. GENTNER. [L. S.]